June 25, 1957  A. P. DOUGLAS ET AL  2,797,105
FRAME AND BODY STRUCTURE OF JUVENILE VEHICLE
Filed March 8, 1955  4 Sheets-Sheet 1

INVENTORS,
ALVIN P. DOUGLAS
GILBERT B. HAHN
BY Golrick & Golrick, Attys.

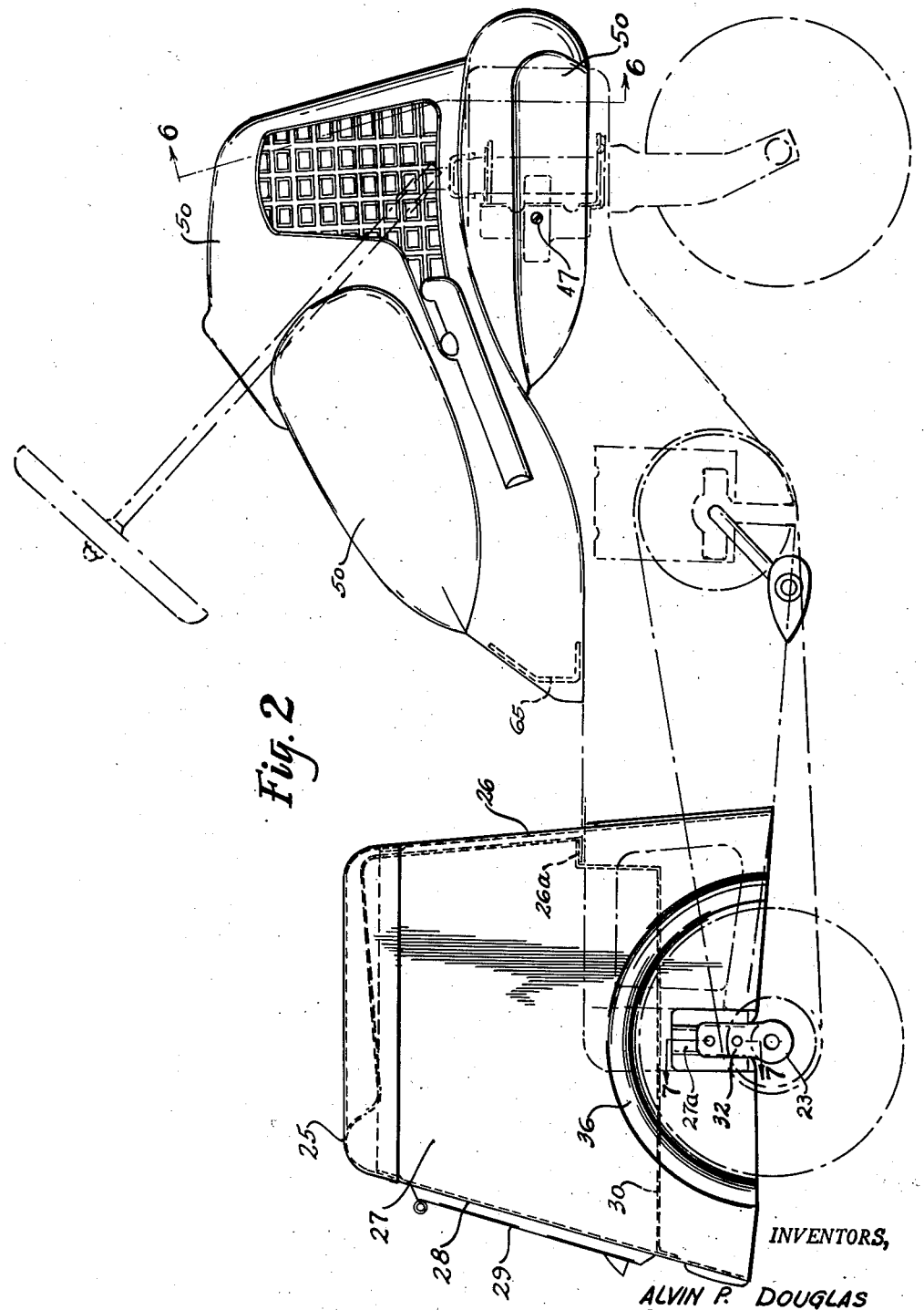

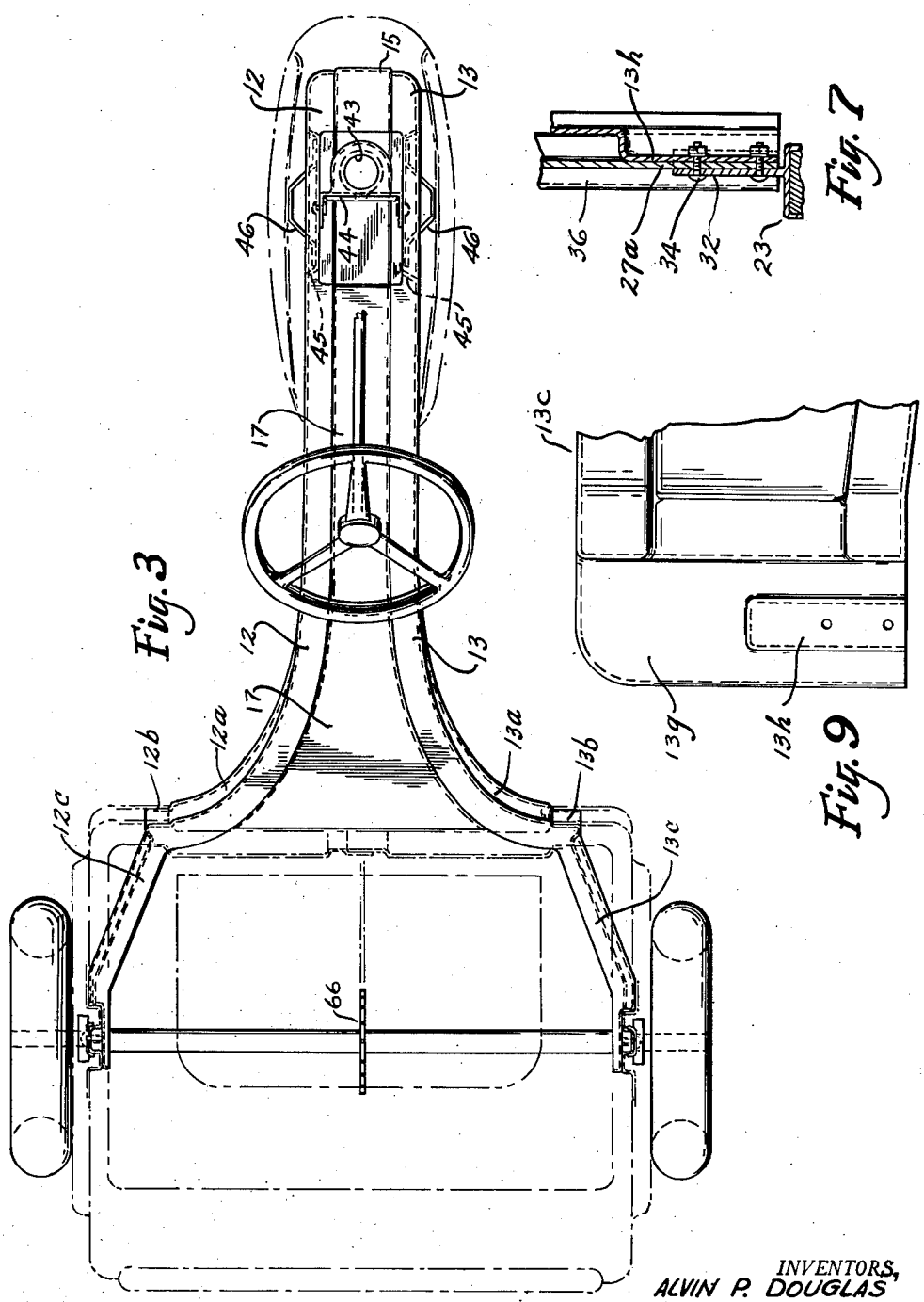

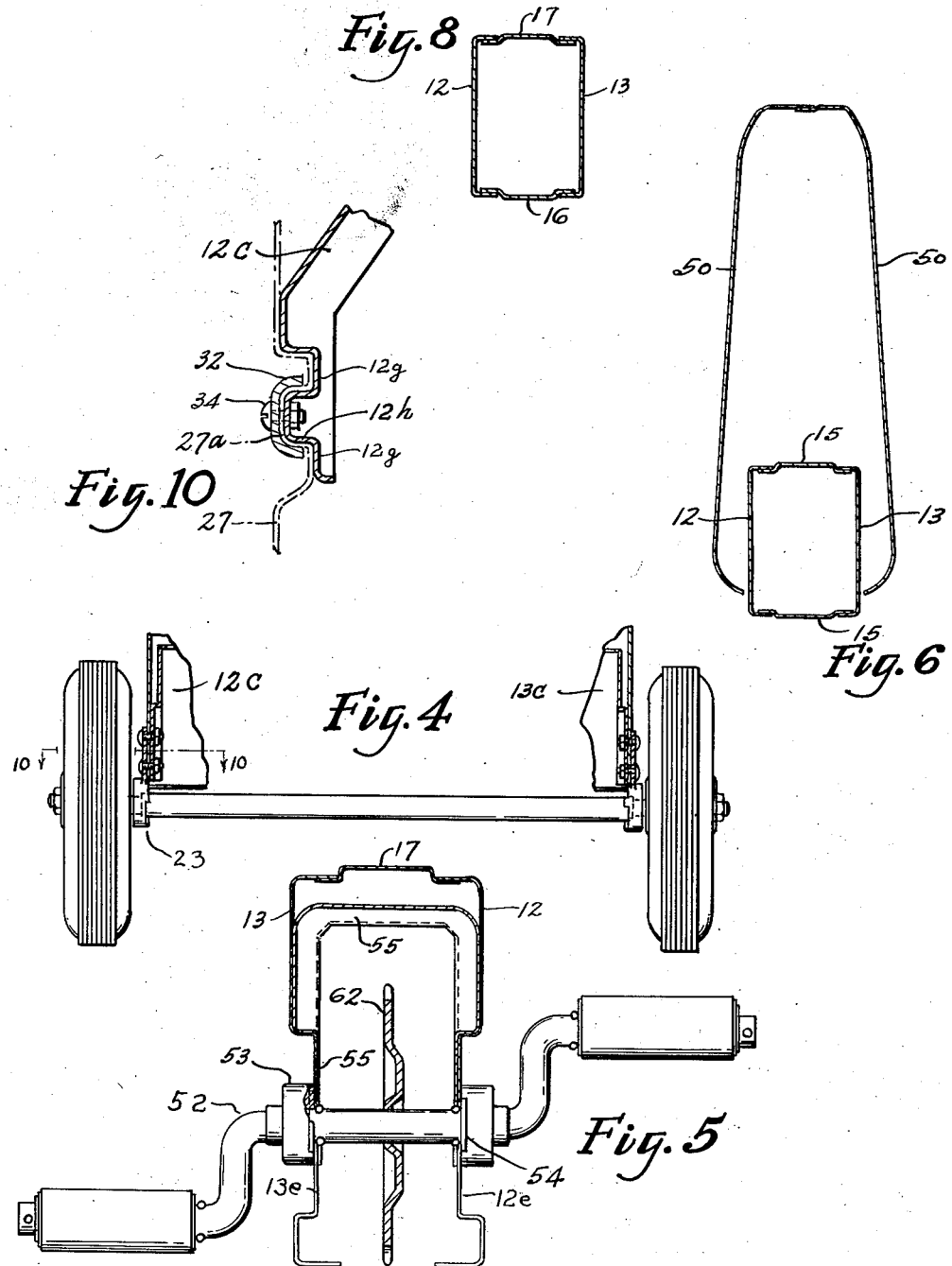

United States Patent Office 2,797,105
Patented June 25, 1957

2,797,105

FRAME AND BODY STRUCTURE OF JUVENILE VEHICLE

Alvin P. Douglas, Cleveland Heights, and Gilbert B. Hahn, Lyndhurst, Ohio, assignors to The Murray Ohio Manufacturing Company, Cleveland, Ohio, a corporation of Ohio Application March 8, 1955, Serial No. 493,018

6 Claims. (Cl. 280—282)

This invention is directed to the provision of a juvenile vehicle of unique appearance and construction and has for its general object the provision of a chassis structure readily adaptable to the mounting and support thereon of various body structures simulating delviery carts such as ice cream carts, tractors and caddy carts.

A more specific object of the present invention is the provision of a light weight low slung tricycle frame comprising right and left hand mirror image beam members so formed that when laterally joined with connecting plates the resulting structure comprises a hollow beam to which may be connected a forward dirigible wheel and two rear wheels with attendant pedal drive means all carried by the two beam members whereby various body designs may be mounted upon and be carried by the beam members.

A further object is the provision of a rear end construction in simulation of a delivery cart body closed at the top to form a seat and specially formed at the bottom to telescopically fit the rear portions of the tricycle frame members in such manner as to form a strut connection between the body structure and the frame members at the lower forward corners of the body structure.

A still further object of the invention is a novel connecting construction between the lower sides of the body structure and the rear ends of the tricycle frame members whereby a mutual reinforcement of the body and frame members is effected at the loci of rear axle attachments to the vehicle.

Other objects of the invention will become apparent to those skilled in the art from the following description referring to the accompanying drawings illustrating a preferred embodiment thereof. The essential characteristics are summarized in the claims.

In the drawings:

Fig. 2 is a side elevational view similar to Fig. 1 but with the body structures in solid lines and the tricycle structure in dot and dash lines;

Fig. 3 is a plan view of the tricycle construction with the body structures shown in dot and dash lines;

Fig. 4 is a fragmentary sectional rear elevation of the tricycle construction;

Fig. 5 is a transverse sectional elevation taken along the line 5—5 of Fig. 1;

Fig. 6 is a transverse sectional elevation of the forward body structure taken along the line 6—6 of Figs. 1 and 2;

Fig. 7 is a cross sectional view taken through a rear axle bearing bracket where attached to the tricycle frame and the rear body structure substantially along the line 7—7 of Fig. 2;

Fig. 8 is a cross section taken through the tricycle beam substantially along the line 8—8 of Fig. 1;

Fig. 9 is a fragmentary side elevation of the rear end of the right beam member; and Fig. 10 is a horizontal cross sectional view taken through a rear axle bearing bracket.

Figure 1:
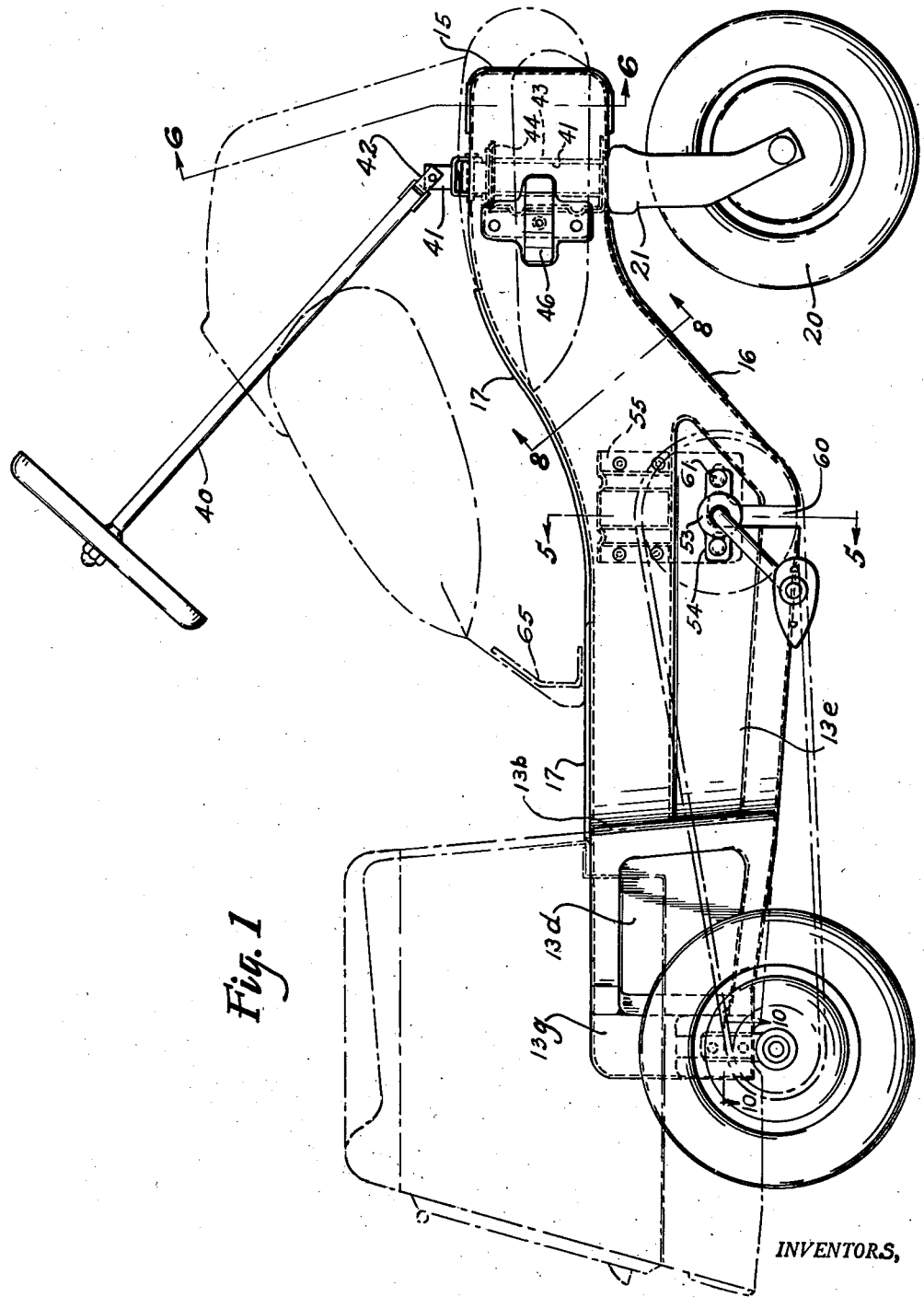
Fig. 1 is a side elevation of the tricycle construction showing the attachable body constructions in place in dot and dash lines.

The present invention contemplates a drop frame chassis or tricycle frame construction formed primarily of a right and a left hand flanged or channel shaped member which are mirror images in design and joined together at the flanges thereof by cross plates to form substantially a rugged box beam structure. Within the hollow beam are carried a front steering post mounting and bearing crank and chain sprocket mounting. The right and left hand beam members are spaced apart and extend substantially parallel through the forward reaches thereof throughout substantially half the length of their beam structure and then are curved outwardly and extend rearwardly to define the width of an attachable rear body structure while forming strengthening struts for the attachable rear body structure. The flanged shapes of the left beam member 12 and the right beam member 13 are shown in Fig. 3 as being flanged throughout their perimeters.

The forward flanged ends of the beam members 12 and 13 are rigidly connected by a paneled U-shaped cross plate 15, paneled bottom plate 16 and paneled top plate 17. Thus the forward beam structure of the tricycle constitutes the two flanged beam members and the three paneled cross plates 15, 16 and 17 which are welded to the inwardly extending flanges of the beam members.

As shown in Figs. 1 and 2 the forward part of the beam structure is formed at an elevation relative to the crank carrying portion thereof to provide clearance for a dirigible wheel 20 and its fork 21 thus in effect forming a drop frame for the tricycle.

As stated the rearward portions of the beam members 12 and 13 flare outwardly and as will be noted in Fig. 3 the beam members are curved and sloped slightly to the vertical as shown at 12a and 13a, the curved portions terminating at upstruck lands 12b and 13b which serve as supporting and connecting pads for the forward wall of the rear body structure as will be explained. The beam members are continued rearwardly in the form of diagonal strut portions 12c and 13c which terminate in bearing bracket and body mounting formations for rear axle suspension as will be described. The beam portions are paneled to add strength to the strut portions thereof as shown in Fig. 1. It will be noted also that inset or paneled formations 13e are formed to extend from the region of the hanger mounting rearwardly throughout the curved portions 12a and 13a to the body attaching land formations 12b and 13b for strengthening purposes.

The rear ends of the two beam members terminate in parallel vertically extending flanged flat portions 12g, 13g having vertically extending bosses or attaching lands 12h, 13h (see Fig. 9) which serve as keys for the bottom regions of the side walls of the rear body structure and also as a stabilizing means for bearing bracket members 23 which support the rear axle.

The rear body structure may comprise a simulation of a variety of truck body appearances such as a fire hose truck, an ice cream truck, a caddy car etc., but in each event the construction of the side and forward walls will have structural characteristics permitting of a ready and firm mounting of the body on the rear ends of the beam members 12 and 13. These characteristics are the shaping of the forward wall of the body to fit upon the beam lands 12b and 13b, the slide fitting of the bosses 12h, 13h (Figs. 9 and 10) and a seat structure on top. In the instant showing an ice cream cart body structure is shown.

The rear body structure comprises a drawn sheet metal top member 25, a forward panel 26, side panels 27 and a rear panel 28 provided with a door 29 and a floor panel 30. The forward panel 26 has the lower central region thereof cut out to clear the beam structure whereby the remainder of the wall may extend downwardly to the bottom of the beam structure at the sides of the beam structure and this body wall tapers to conform to the tapers of the beam lands 12b and 13b and to which the wall extensions may be spot welded or bolted.

The side wall panels 27 have slideway or channel formations 27a complementary to the beam bosses 12h, 13h whereby the lower region of the side walls may nest on the bosses. A vertically extending clamping arm 32 formed on the bearing cup 23 may be clamped by bolts 34 to the bosses 13h of the ends of the beam members 12 and 13 (see Figs. 9 and 10). Thus the rear body structure is telescopically fitted to the beam members at four points i. e. at lands 12b and 13b and at bosses 12h and 13h. If desired still further securement may be effected by having a flange 26a on the forward body panel 26 extend inwardly along the horizontal edge of the beam cut-out of panel 26 which may be spot welded or otherwise secured to the beam cross plate 17. Also, if desired, bolts extending through the beam lands 12b and 13b and the seated portions of the front panel thereon may be used.

As viewed in Fig. 3 it will be noted the strut portions 12c and 13c serve to mutually stiffen the rear beam and body structures. Simulated fenders 36 may be struck outwardly on the side panels further to stiffen them.

The forward end of the tricycle structure may comprise two drawn mirror image shell members 50 contoured to simulate generally the forward end of a tractor. In the illustration (see Figs. 2 and 6) the hood like structure extends downwardly to embrace the forward sides of the beam structure (see Fig. 6) while the bottom of the rear portion is contoured to the drop frame shape of the beam structure. This hollow structure may serve as a support for a steering post 40 connected to the steering stem 41 by a universal joint 42.

The steering fork stem 41 is suitably supported and journalled in a bearing tube 43 of bracket 44 which is shaped to span the inner opposed faces of the two beam members 12 and 13 at insets 45 formed in the side faces of the beam members. As shown in Fig. 3, the parallel side legs of bracket 44 are secured to the inset portions 45 and to the outer faces of these insets are secured, as by rivets or spot welding, bracket members 46 having threaded openings for bolts 47 passing through the lower regions of hood members 50 for lower securement thereof to the beam structure.

The pedal hanger mounting is adjustable for chain tightening and as shown in Figs. 1 and 5 comprises a crank hanger 52, bearing cups 53 having bolt flanges 54 extending horizontally and an interiorly disposed hanger bracket 55. The bracket 55 is fixed to the inner side faces of the beam members 12 and 13 as by rivets or welding to provide a stiffened beam construction, since the beam members are slotted at 60 (see Fig. 1) to permit assembly of the crank, its bearings 53 and chain sprocket 62, as a unit on the beam structure. Bolts 61 (Fig. 1) extend through horizontally elongated apertures in the side walls of the beam members and the lower reaches of bracket 55 for securing the bearing brackets 54 in adjusted position. Thus after knock-down shipment the rear bearing brackets and the hanger bearing brackets with chain in position on rear axle sprocket 66 can be attached readily to the tricycle frame and the front fork and wheel assembled on the frame before the hood structure is attached. It will be understood that the hood structure may have other means of attachment in addition to the screw bolts 47 such as could be obtained by a reversal of the foot on the pedestal bracket 65 whereby it would be exposed to bolting to the top of the box beam structure.

The construction of the tricycle frame and wheel mountings are such that a variety of simulations of bodies and hoods may be attached to the frame as will be understood without modification or change in the production tools required for the manufacture of the tricycle frame.

We claim:

1. A frame and body structure for a juvenile vehicle comprising spaced apart right and left hand beam members formed generally to be mirror images of each other and forming a beam structure, said members being formed at their rear portions to curve outwardly from each other with the curvatures terminating in body connecting land formations disposed in a common plane extending transversely of a central vertical plane of the beam structure, said beam members being formed to extend diagonally outwardly and rearwardly from the lands and terminate in parallel body and rear axle attaching bosses, and a hollow body construction rectangular in horizontal cross section with front, side and rear wall panels joined by a top panel comprising a seat, said front wall panel being cut out whereby the front panel may straddle the beam structure and bear upon said land formations and said side panels having boss formations complementary to and fitting on the boss formations on the rear portions of the beam members whereby said diagonal portions of the beam members serve as struts for the front and side walls of the body structure.

2. A frame and body structure for a juvenile vehicle comprising right and left hand flanged metal beam members spaced apart to be adjacent the center line of the vehicle with the flanges thereof in opposite relation, a flanged steering post bearing bracket having the flanges thereof attached to the inner opposed faces of the forward parts of the beam members, said beam members extending rearwardly from the bracket attachment in drop frame fashion, a pedal crank mounting located at the drop in the frame and connected to the opposed faces of the beam members, said beam members being continued rearwardly from the hanger mounting and flaring outwardly from each other to provide body attaching lands lying in a common plane extending transversely to the center line of the vehicle, said beam members extending rearwardly from said lands and terminating in rearward attaching lands for the sides of a body, a body structure having front, back, top and side walls and open at the bottom, said front and side walls of the body having front wall and side wall depending lower portions fitting the said lands on the beam members, and rear axle brackets in secured relation to the body sides and the rearward lands.

3. A frame and body structure for a juvenile vehicle comprising right and left hand channel beam members formed generally to be mirror images of each other and spaced apart at the forward portions thereof to extend adjacent and parallel to the longitudinal center line of the vehicle, said forward parallel portions being connected by upper and lower plates to form a box beam structure, said beam members being curved apart intermediate the box beam structure and the rear ends of the beam members with the curved parts extending to diagonal portions of the beam members, said diagonal portions terminating in rear end portions of the beam members which are parallel and define the width of the vehicle, a body structure rectangularly shaped in cross section having a front wall and side walls attached to the beam members and vertically extending channel formations in the side walls of the body, the parallel end portions of the beams having vertically extending channel formations, the channel formations of the side walls of the body being fitted in the channel formations of the said parallel rear portions, and rear axle bearing brackets overlying the channel formations of the beam and body and secured to the beam rear end portions and body.

4. A frame and body structure for a juvenile vehicle comprising right and left hand flanged metal beam members spaced apart to be adjacent the center line of the vehicle with the flanges thereof in opposite relation, cross plates secured to the flanges on the beam members thereby to form a box beam structure at the forward part of the vehicle, a flanged steering post bearing bracket having the flanges thereof attached to the inner opposed faces of the beam members, said box beam structure extending rearwardly from the bracket attachment in drop frame fashion, a pedal crank mounting located at the drop in the beam members, said flanged beam members being continued rearwardly from the hanger mounting and flaring outwardly from each other to provide body attaching lands lying in a common plane extending transversely to the center line of the vehicle, said beam members extending rearwardly from said lands and terminating in rearward attaching lands for the sides of a body, a body structure having front, back, top and side walls and open at the bottom, said front and side walls of the body having front wall and side wall depending lower portions fitting the said lands on the beam members, and rear axle brackets in secured relation to the body sides and the rearward lands.

5. A frame and body structure for a juvenile vehicle comprising right and left hand beam members formed generally to be mirror images of each other spaced apart and extending from the front to the rear of the vehicle, said beam members being arranged at the forward portions thereof to be adjacent and parallel to the longitudinal center line of the vehicle and having rear extensions extending outwardly to diagonal portions extending rearwardly and terminating in vertically extending body engaging lands formed in parallel rear ends of the beam members, said ends defining the width of the vehicle, said beam members having body engaging land formations located at the forward parts of the diagonal portions thereof, a hollow body surmounting the diagonal and rear parallel portions of the beam members having lower marginal parts thereof shaped to fit the forward land formations of the diagonal portions of the beam members and the lands formed in the rear end portions of the beam members.

6. A frame and body structure for a juvenile vehicle comprising two flanged beam members with the forward portions thereof juxtaposed to the longitudinal center line of the vehicle and with the flanges thereof oppositely disposed, said flanged beam members having intermediate drop frame portions, a crank hanger bracket located at the drop of the beam members and connected to the opposed faces of the beam members, said flanged beam members extending rearwardly from the hanger bracket and flaring outwardly from each other to provide body attaching lands disposed in a plane transversely of the vehicle, said beam members forming a beam structure, a body structure comprising front, side, rear and top walls and open at the bottom, the front wall of the body at the lower portion thereof being cut out to clear the beam structure whereby the lower portions of the sides of the front wall may rest upon the lands on the flared portions of the beam members, said beam members having portions extending rearwardly from the flared portions thereof and terminating in side lands for attachment to the body substantially midway of the lower portions of the side walls of the body, rear axle supporting brackets overlying the side walls of the body and the rear terminal lands of the beams, and securing means connecting the front wall and the side walls to the lands of the beam members.

References Cited in the file of this patent

UNITED STATES PATENTS

| | | |
|---|---|---|
| 832,628 | Schreffler | Oct. 9, 1906 |
| 1,704,068 | Wolfe | Mar. 5, 1929 |
| 2,237,677 | Lewis | Apr. 8, 1941 |
| 2,242,269 | Siebler | May 20, 1941 |
| 2,438,534 | Bowers | Mar. 30, 1948 |